United States Patent [19]
Kincaid

[11] Patent Number: 5,964,816
[45] Date of Patent: Oct. 12, 1999

[54] ADDRESS COMMUNICATION METHOD FOR A DISTRIBUTED ARCHITECTURE SUPPLEMENTAL INFLATABLE RESTRAINT SYSTEM

[75] Inventor: Kevin Dale Kincaid, Kokomo, Ind.

[73] Assignee: Delco Electronics Corp., Kokomo, Ind.

[21] Appl. No.: 09/012,976

[22] Filed: Jan. 26, 1998

[51] Int. Cl.⁶ .......................... B60R 21/00; B60R 21/32
[52] U.S. Cl. .......................... 701/45; 701/49; 340/436; 340/438; 280/735; 180/271
[58] Field of Search .................. 701/45, 49; 340/825.31, 340/825.34, 436, 457.1, 666, 7, 438; 280/730.1, 730.2, 734, 735; 184/271

[56] References Cited

U.S. PATENT DOCUMENTS

| | | | |
|---|---|---|---|
| 5,583,771 | 12/1996 | Lynch et al. | 701/45 |
| 5,629,847 | 5/1997 | Shirakawa et al. | 701/45 |
| 5,702,123 | 12/1997 | Takahashi et al. | 280/735 |
| 5,718,451 | 2/1998 | White | 280/735 |
| 5,821,633 | 10/1998 | Burke et al. | 701/45 |
| 5,825,098 | 10/1998 | Darby et al. | 701/45 |
| 5,826,902 | 10/1998 | Foo et al. | 280/735 |
| 5,848,661 | 12/1998 | Fu | 180/273 |

*Primary Examiner*—Jacques H. Louis-Jacques
*Assistant Examiner*—Yonel Beaulieu
*Attorney, Agent, or Firm*—Jimmy L. Funke

[57] ABSTRACT

A distributed architecture SIR system having remote sensor and initiator driver modules communicating over a common bus utilizes an address communication method which permits the communication of information to multiple remote modules at the same time, thereby minimizing the number of messages that must be transmitted across the bus to cause a given action to occur. According to the method, each remote initiator driver module is assigned three different ID codes: a node ID code, a deployment event ID code and an occupant zone ID code. The node ID code is unique to the module, and is used for the transmission of information (such as diagnostic state) specific to that module. The deployment ID code identifies multiple remote initiator modules associated with restraint devices which will ordinarily be deployed concurrently in a given type of crash event, and is used for the transmission of deployment commands to such modules. The occupant zone ID code identifies multiple remote initiator modules associated with restraint devices for a particular seating position in the vehicle, and is used for the transmission of occupant sensor information or decisions to such modules. This method effectively increases the communication speed of the bus because it obviates the sending of multiple successive like-content messages over the communication bus.

4 Claims, 7 Drawing Sheets

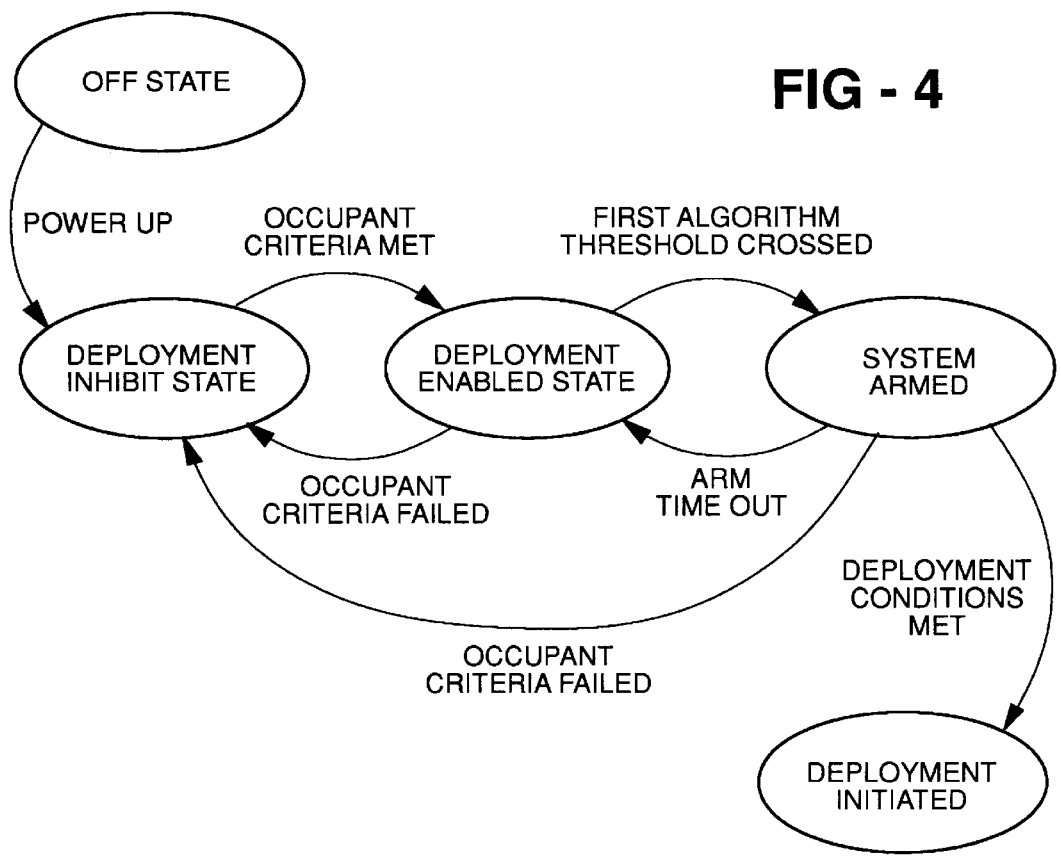
FIG - 4
FIG - 5
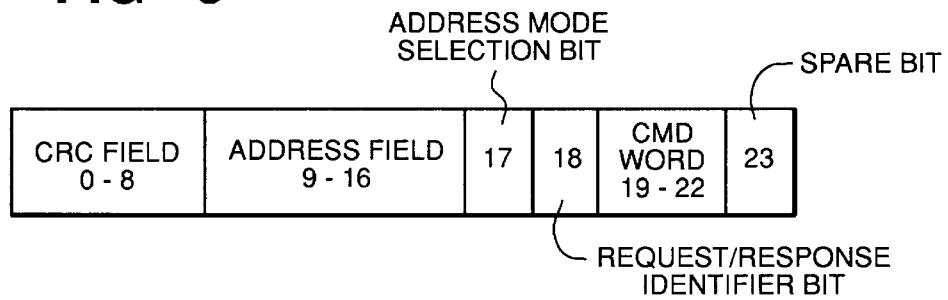
FIG - 6
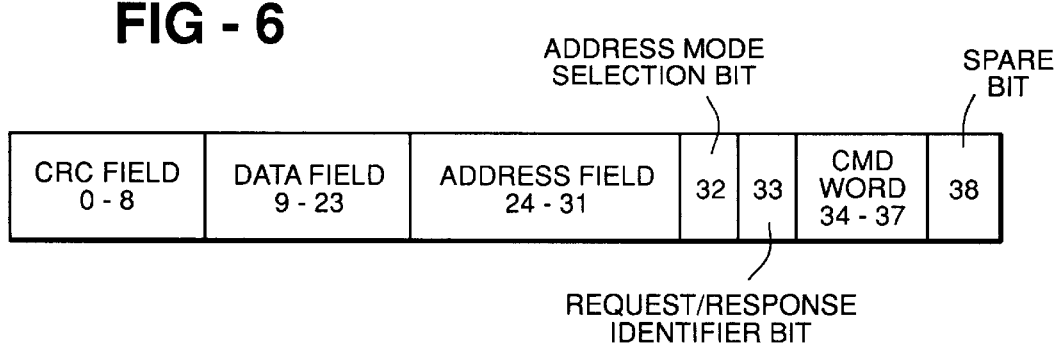

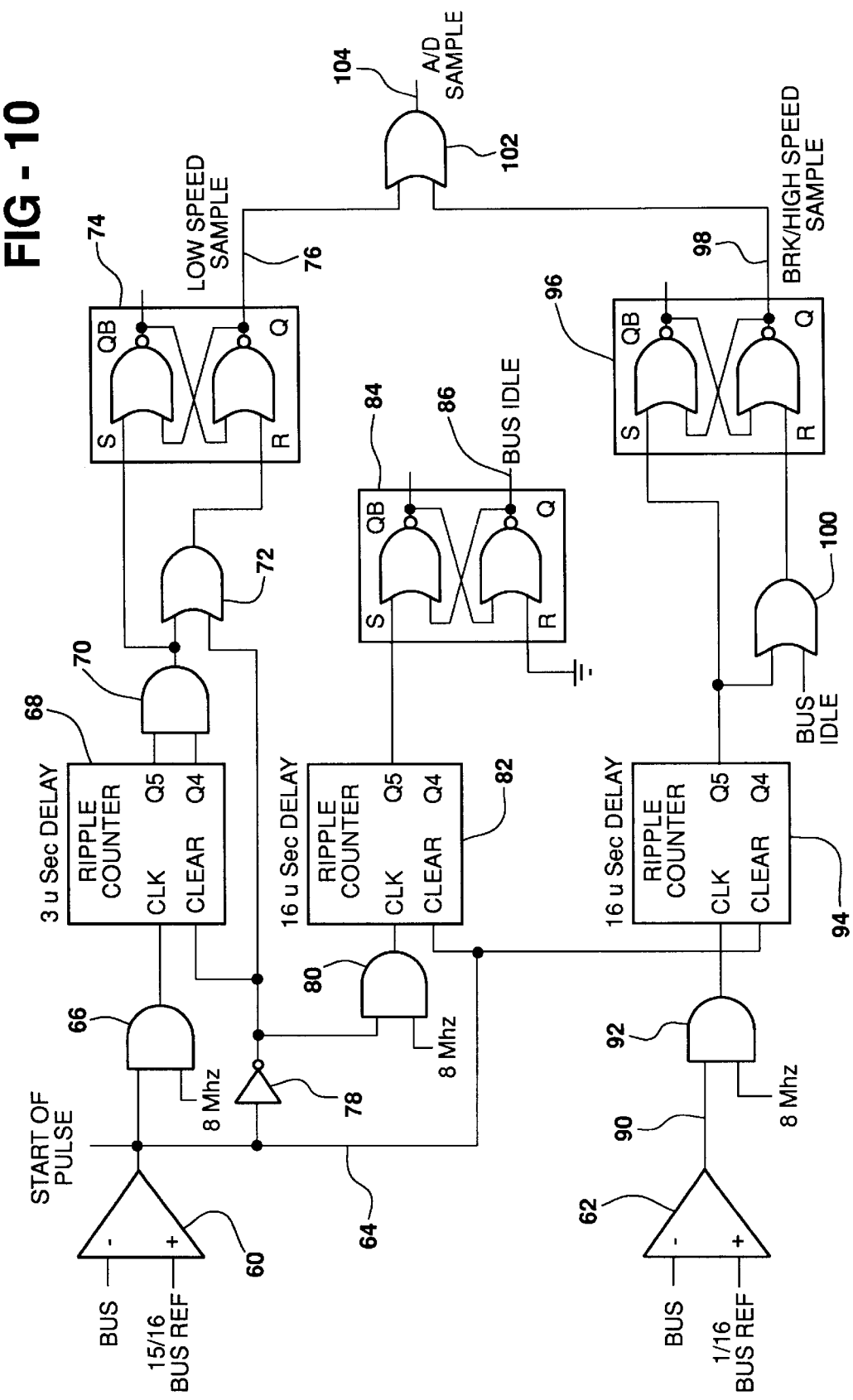

ADDRESS COMMUNICATION METHOD FOR A DISTRIBUTED ARCHITECTURE SUPPLEMENTAL INFLATABLE RESTRAINT SYSTEM

This invention relates to automotive supplemental inflatable restraint (SIR) systems having a distributed architecture characterized by multiple electronic modules communicating via a high-speed data and communication bus, and more particularly to an address communication method therefor.

BACKGROUND OF THE INVENTION

In general, SIR systems perform a number of functions including crash sensing, diagnostics, signal processing and analysis, and deployment of one or more restraint devices such as frontal or side air bags or seat belt pretensioners. When the system is designed such that the components for performing most or all of these functions are packaged together in single electronic module, the system architecture may be characterized as centralized. When the system is designed so that the components are separately packaged based on functionality and interconnected by a data and communication bus, the system architecture may be characterized as distributed.

The selection of centralized vs. distributed architecture depends upon a number of factors, including the number of restraint devices, controller throughput requirements, package size, system cost and assembly considerations. In relatively simple mechanizations involving a small number of restraint devices and limited sensing and processing requirements, the centralized architecture may offer cost and assembly advantages. In relatively complex mechanizations involving a large number of restraint devices and sophisticated sensing and processing requirements, the distributed architecture may offer packaging and processing advantages.

A system architecture of the centralized type is schematically represented by the block diagram of FIG. 1. Referring to FIG. 1, the centralized system comprises a high function central processor and a number of side impact sensors, occupant sensors and restraint initiator modules. The central processor includes frontal acceleration sensor(s), power supply and energy reserve devices, interface circuitry for communicating with the sensor and initiator modules, a microprocessor for processing the sensor signals and executing the deployment algorithm, diagnostic circuitry and firing circuits for each of the restraint initiators. The remote side impact sensors provide information which may be difficult to sense in a central location of the vehicle, and the remote occupant sensors provide information about occupant position that is taken into consideration by the deployment algorithm.

A system architecture of the distributed type is schematically represented by the block diagram of FIG. 2. Referring to FIG. 2, the distributed system still includes a central processor, but the sensors and initiator firing circuits (squib drivers) are packaged individually and located remote from the central processor. The role of the central processor as a communications interface now becomes more important, and other functions such as power supply and deployment control may be performed either centrally or in the remote modules, enabling the central processor to be minimized, or even up-integrated into another multi-function controller. Additionally, the flexibility of the system is increased since adding further sensors and/or initiators has only a modest impact on system cost.

Despite the many advantages of the distributed SIR system architecture, a potential disadvantage concerns the tolerance of the system to faulty modules and corrupted communication among the modules. In general, this concern increases in mechanizations where the processing functions are increasingly delegated to the remote modules, since there is no longer one central processor that has access to all possible sensor information and which is responsible for all deployment decisions.

Another potential disadvantage of a distributed SIR system architecture is that messages have to be passed very quickly over the communication bus in order to ensure that deployment of the restraint device can be initiated within 500 $\mu$sec of a valid crash detection. With conventional communication protocols such as the CAN-based protocol, the required data communication rates would exceed the usual norms, ruling out the use of standard, off-the-shelf devices.

SUMMARY OF THE PRESENT INVENTION

The present invention is directed to an improved distributed architecture SIR system having remote sensor and initiator driver modules communicating over a common bus, wherein the system utilizes an improved address communication method which permits the communication of information to multiple remote modules at the same time, thereby minimizing the number of messages that must be transmitted across the bus to cause a given action to occur. According to the method, each remote initiator driver module is assigned three different ID codes: a node ID code, a deployment event ID code and an occupant zone ID code. The node ID code is unique to the module, and is used for the transmission of information (such as diagnostic state) specific to that module. The deployment ID code identifies multiple remote initiator modules associated with restraint devices which will ordinarily be deployed concurrently in a given type of crash event, and is used for the transmission of deployment commands to such modules. The occupant zone ID code identifies multiple remote initiator modules associated with restraint devices for a particular seating position in the vehicle, and is used for the transmission of occupant sensor information or decisions to such modules. In communicating with a remote initiator module, the sending module (which may be a crash or occupant position sensor module or a central controller) indicates the type of ID code, and multiple initiator modules, in turn, filter the message to determine if there is an ID code match. This method effectively increases the communication speed of the bus because it obviates the sending of multiple successive like-content messages over the communication bus.

BRIEF DESCRIPTION OF THE DRAWINGS

FIG. 4 is a state diagram of a deployment control method.

FIG. 5 is diagram of a message structure according to this invention for sending a command or information request to a remote initiator driver.

FIG. 6 is diagram of a message structure according to this invention for sending a response or acknowledgment from a remote initiator driver.

FIG. 10 is a block diagram of a bus monitor circuit in the receiver circuit of FIG. 9.

DETAILED DESCRIPTION OF THE DRAWINGS

As indicated above, there exist different system configurations within the general definition of distributed SIR architecture. Two exemplary configurations are schematically depicted in FIGS. 3A and 3B.

Figure 1:
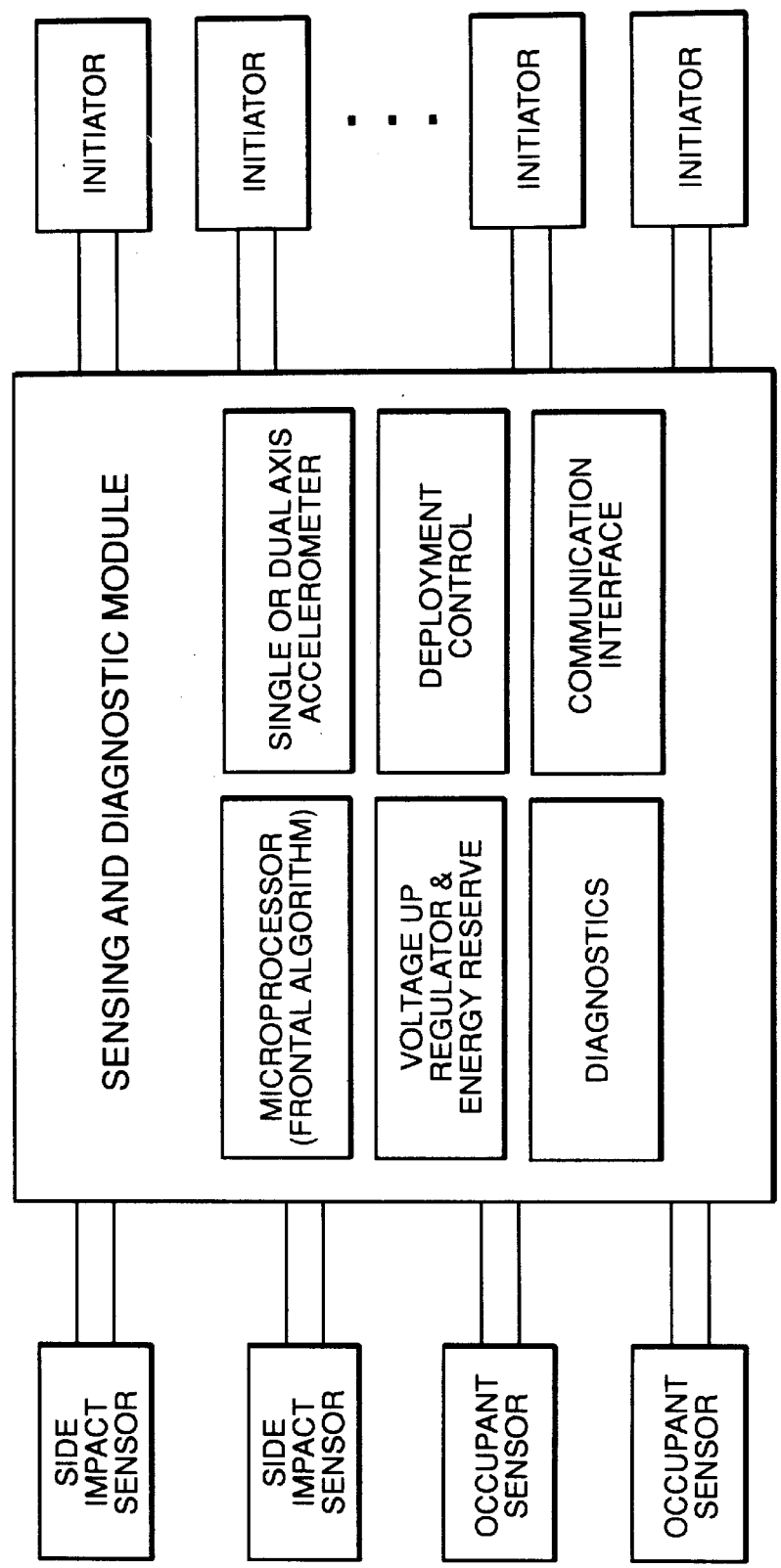
FIG. 1 is schematic diagram of a SIR system having a centralized architecture.
Figure 2:
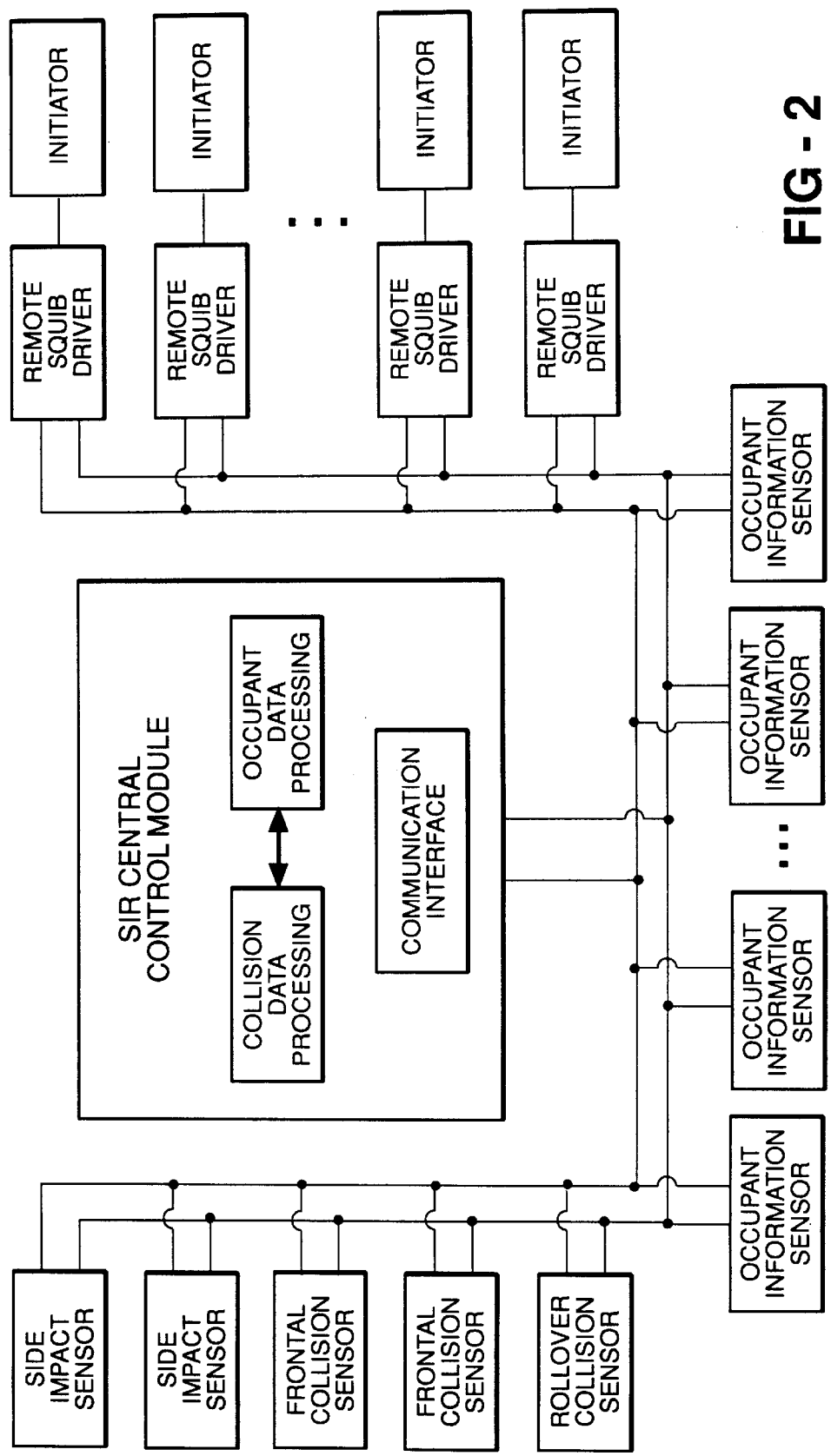
FIG. 2 is schematic diagram of a SIR system having a distributed architecture.
Figure 3:
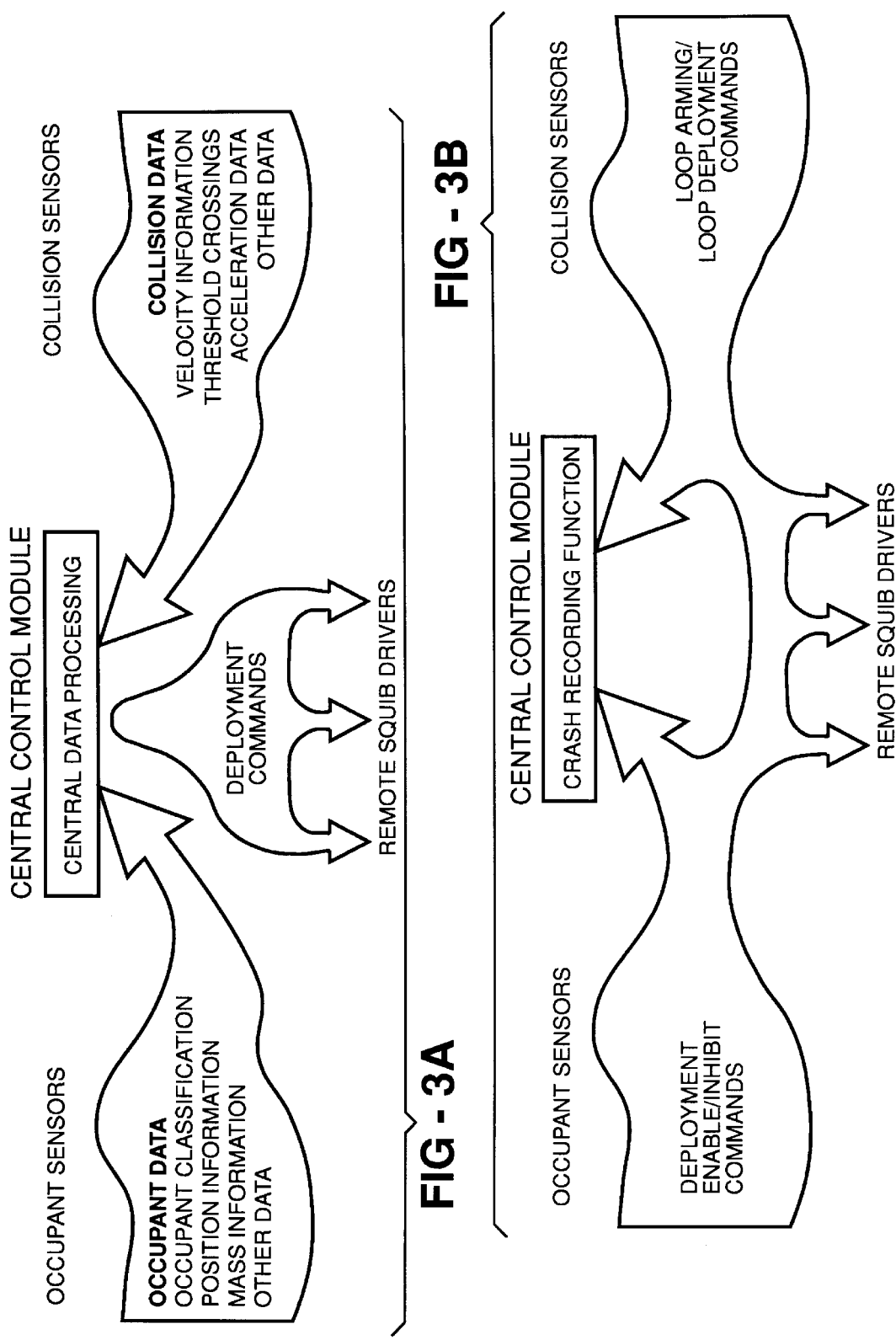
FIGS. 3A and 3B are diagrams of two different variations of distributed SIR architecture to which the deployment control method applies.

FIG. 3A represents a configuration in which the central controller performs all of the occupant information and crash discrimination processing. Alternatively, some signal processing may be performed at the sensor modules to reduce the central controller processing burden. In any event, deployment commands are developed in the central controller and then transmitted to the remote initiator modules. Thus, information flows to the central controller from the occupant and collision sensors, and to the remote initiator modules from the central controller. The transmitted collision sensor data can take many forms including raw deceleration data or preprocessed information, such as the change in vehicle velocity. This type of configuration allows a very sophisticated crash discrimination algorithm to be implemented in the central controller. The discrimination algorithm may include a safing function by comparing vehicle deceleration data from multiple collision sensors mounted in different locations in the vehicle. It may compare both longitudinal deceleration and lateral deceleration to provide improved discrimination of angular impacts. The algorithm may also be tailored to accommodate dual stage or multi level inflation of the frontal airbags by utilizing a collision sensor mounted in the front of the vehicle as a crash severity indicator and using a passenger compartment collision sensor to provide safing and ensure that the high severity is not caused by a sensor malfunction or a localized abuse event. In a similar manner, the occupant sensors monitor for occupant status and provide this data to the central controller over the high speed data bus. This information is then processed along with the vehicle deceleration data in order to determine the proper level of restraint deployment required based on the occupants' physical characteristics and the type of crash event. The central controller can then modify the level of inflation in a multi level inflation system or it can inhibit the deployment of an airbag all together if the occupant is at risk of an inflation induced injury.

FIG. 3B represents a configuration in which the intelligence of the central controller can be distributed out into the appropriate remote mounted devices. The collision sensors would not only monitor the vehicle deceleration but would also process this information using a local crash discrimination algorithm. The collision sensor would then transmit a deployment command directly to a remote initiator driver. Likewise, the occupant sensors would monitor the position of the passenger and would inhibit the deployment of the airbag when the occupant was at risk of an inflation induced injury by sending an inhibit message directly to a remote initiator driver. This type of system reduces the amount of processing power required for a central controller. It may also allow the remaining functionality of the central controller to be up integrated with a separate electronic control module such as a vehicle anti lock brake controller, which would result in system cost reduction.

In the illustrated embodiment, a multiple-state deployment control strategy is utilized to provide fault tolerant communications and to ensure that the signals provided by various remote sensor modules are properly considered in determining whether to deploy the restraint devices. FIG. 4 is a state diagram for a remote initiator module (RIM) depicting its various states and decision criteria for changing states. The state diagram is thus representative of computer program instructions executed by a microprocessor or logic circuit incorporated within each RIM. Referring to the diagram, the deployment control method defines four separate states: an inhibit state, an enabled state, an armed state, and a deployment initiated state. In the inhibit state none of the occupant position, collision safing, or restraint initiation criteria have been met. In the enabled state the occupant position criteria has been met but the collision safing and restraint initiation criteria have not been met. In the armed state the occupant position and collision safing criteria have been met but not the deployment initiation criteria. In the deployment initiated state all three criteria have been met.

As shown in the diagram, the remote initiator driver powers up in the inhibit state. Airbag deployment would not be allowed in this state. If the system determines that an occupant is present for the location related to this airbag, and is properly positioned to benefit from deployment of the airbag in the event of a crash, then a deployment state command message would be issued and the remote initiator module would transition to the enabled state. This message could be sent by either the occupant sensor or the central controller depending on the location of the data processing. If the occupant shifts or moves, and is no longer in proper position, the remote initiator module would transition back to the inhibit state. Once in the enabled state, a second message would be required to transition the remote initiator module to the armed state. This message would be sent by either the collision sensor or the central controller depending on the data processing configuration. The use of this state permits safing functions to be built into the system, if desired, by requiring vehicle deceleration data from multiple sensor locations to agree prior to transmitting the system arm deployment command. A remote initiator driver is only allowed to be in the armed state for a predetermined length of time. After this time duration is elapsed the remote initiator driver will automatically transition back to the enabled state. Also, if the occupant shifts or moves, and is no longer in proper position, the remote initiator module would transition back to the inhibit state, as noted above. Once in the armed state, the remote initiator module can be transitioned to the deployment initiated state on receipt of a deployment command from either the collision sensor or the central control module. In this state, the remote initiator driver allows current to flow through the restraint initiator, causing deployment of the restraint.

The use of the above-described deployment control method allows for fault tolerance to be built into the system. A remote initiator driver must receive three unique deployment control messages prior to initiating the deployment of the restraint device. This provides protection from electromagnetic interference that might cause a single communication message to be corrupted. The armed state time-out function ensures that the vehicle deceleration that led to the deployment initiated state occurred as a single contiguous event.

According to the present invention, the number of messages that must be transmitted across the communication bus to produce any given action is minimized through the use of a communication method which permits the communication of information to multiple remote modules at the same time. According to the method, each remote initiator driver module is assigned a Node ID code, a Deployment Event ID code and an Occupant Zone ID code. In communicating with a remote initiator module, the sending module (which may be a crash or occupant position sensor module or a central controller) indicates the type of ID code, and multiple initiator modules, in turn, filter the message to determine if there is an ID code match.

The Node ID code is unique to the module, and is used for the transmission of information (such as diagnostic state) specific to that module. This enables a central controller or service tool to obtain information about the condition of a specific module connected to the bus.

The Deployment Event ID code identifies multiple remote initiator modules associated with restraint devices which will ordinarily be deployed concurrently in a given type of crash event. For example, if a longitudinal acceleration sensor detects a frontal crash of relatively low severity, it could send a deployment command with a Deployment Event ID code that would be recognized by all of the remote initiators associated with seat belt pretensioners. In the same way, if a lateral acceleration sensor detects a left side collision, it could send a deployment command with a Deployment Event ID code that would be recognized by all of the remote initiators associated with the left side air bags and seat belt pretensioners. A high content SIR system might include different codes for left side impacts, right side impacts, rear impacts, low severity frontal impacts, medium severity frontal impacts, high severity frontal impacts, and vehicle roll-over, each type of event warranting the deployment of a different combination of restraint devices. An exemplary chart of events, corresponding restraint devices, and Deployment Event ID codes is set forth below. As may be seen from the deployment strategy illustrated by the chart, the seat belt pretensioners are deployed in any type of impact; in the illustrated embodiment, the corresponding initiator drivers modules would therefore recognize and respond to all six Deployment Event ID codes. Similarly, the left and right side air bags would each recognize and respond to two different Deployment Event ID codes. The LP and HP designations in respect to the front airbags refer to low power (LP) and high power (HP) deployment force, each front airbag having a separate initiator driver module for each deployment power level.

| IMPACT TYPE | DEPLOYED RESTRAINTS | ID CODE |
| --- | --- | --- |
| Frontal, Severity 1 | Pretensioners | 0001 |
| Frontal, Severity 2 | Pretensioners + LP Front Airbags | 0010 |
| Frontal, Severity 3 | Pretensioners + HP Front Airbags | 0011 |
| Left Side Impact | Pretensioners + Left Side Airbag | 0100 |
| Right Side Impact | Pretensioners + Right Side Airbag | 0101 |
| Rollover | Pretensioners + All Side Airbags | 0110 |

The Occupant Zone ID code identifies multiple remote initiator modules associated with restraint devices for a particular seating position in the vehicle, just as each occupant sensor monitors a particular seating position. If the occupant of the monitored seating position is determined to be "out of position", the sensor could send an inhibit command with a Occupant Zone ID code that would be recognized by all of the remote initiators associated with that seating position. An exemplary chart of events, corresponding restraint devices, and Occupant Zone ID codes is set forth below.

| SEAT POSITION | AFFECTED RESTRAINTS | ID CODE |
| --- | --- | --- |
| Front-Left | Front Left Side Airbag<br>Left Frontal Airbag (LP and HP)<br>Left Frontal Pretensioner | 0001 |
| Front-Center | Center Frontal Airbag (LP and HP)<br>Center Frontal Pretensioner | 0010 |
| Front-Right | Front Right Side Airbag<br>Right Frontal Airbag (LP and HP)<br>Right Frontal Pretensioner | 0011 |
| Rear-Left | Rear Left Side Airbag<br>Left Rear Pretensioner | 0100 |
| Rear-Center | Center Rear Pretensioner | 0101 |
| Rear-Right | Rear Right Side Airbag<br>Right Rear Pretensioner | 0110 |

An exemplary message structure for sending a command or an information request to a remote initiator module is set forth in FIG. 5. In the illustrated structure, the message occupies 24 bits, and comprises five different fields and one spare bit.

The CRC field is reserved for a standard Cyclic Redundancy Check which detects message errors, and contains a nine-bit word generated by the sending module. Initiator modules responding to the message divide the CRC word by a known polynomial. If received correctly, the remainder will match a stored value, indicating the message has been received correctly.

The Address field is an eight-bit field reserved for the intended destination address, and the Address Mode Selection bit indicates the type of address contained in the Address field. In the illustrated embodiment, a "1" in the Address Mode Selection bit indicates that the Address field contains the Node ID of an initiator module, and a "0" in the bit indicates that the Address field contains an initiator module Deployment Event or Occupant Zone ID code. Since the Deployment Event and Occupant Zone ID codes require only four bits, as indicated in the preceding charts, one or more of the spare Address field bits are used to indicate whether the embedded code is a Deployment Event code or an Occupant Zone ID code.

The Request/Response Identifier bit indicates whether the message is being sent to or from an initiator module. In the illustrated embodiment, a "0" indicates that an information request or command message is being sent to an initiator module; a "1" indicates that a response to an information request or an acknowledgment of a command message being sent by an initiator module. Thus, a remote initiator module will only respond to a message in which the Request/Response Identifier bit is set to a logic "0".

The Command Word field contains the command for the initiator module(s) targeted by Address field information and the Address Mode Selection bit. A table of exemplary Command Words and descriptions of the corresponding commands are set forth below.

| Command Word | Command Description |
|---|---|
| 0000 | Deployment Command - Command deployment of or more remote initiator drivers. |
| 0001 | Inhibit Command - Inhibit the deployment of one or more remote initiator drivers. |
| 0010 | Arm Command - Arm the deployment of one or more remote initiator drivers. |
| 0011 | Enable Command - Enable the deployment of one or more remote initiator drivers. |
| 0100 | Spare |
| 0101 | Spare |
| 0110 | Reserved Command - This command does not apply to a remote initiator driver. |
| 0111 | Diagnostic Status Command - Request for the diagnostic status information to be returned by the specified device or devices. |
| 1000 | Spare |
| 1001 | Spare |
| 1010 | Node ID Command - Request for one or more devices connected to the bus to return their associated Node ID. |
| 1011 | Deployment Event Control ID/Occupant Zone ID Command - Request for one or more devices connected to the bus to return their associated deployment event control and occupant zone IDs. |
| 1100 | Secondary ID Command - Request for one or more devices connected to the bus to return their associated secondary ID. |
| 1101 | Spare |
| 1110 | Program Node ID or Deployment Event Control ID/Occupant Zone ID Command - This command is targeted at an unprogrammed node. This node is required to program the register selected by the address mode selection bit with the information contained in the address field. |
| 1111 | Program Secondary ID or Configuration Control/Traceability Information Command - This command is targeted at an un-programmed node. This node is required to program the register selected by the address mode selection bit with the information contained in the address field. A logic 1 in the address mode selection bit indicates the secondary ID register. A logic 0 in the address mode selection bit indicates the configuration control/traceability register. |

An exemplary message structure sent by a remote initiator module is set forth in FIG. 6. In the illustrated structure, the message occupies 39 bits, and comprises six different fields and one spare bit. The CRC field is reserved for a standard Cyclic Redundancy Check, as described above in reference to FIG. 5. Likewise, the eight-bit Address field is reserved for the intended destination address, the Address Mode Selection bit indicates the type of address contained in the Address field, the Request/Response Identifier bit indicates whether the message is being sent to or from the initiator module, and the Command Word field contains a command. Additionally, the response message includes a 15-bit data field for providing specific status data.

In the illustrated embodiment, a high voltage two wire communication bus allows the use of multiple voltage levels in the communication protocol, effectively increasing the information content of any given message. One wire of the communication bus is used to define the system ground level, and the other is used for power and communications. Thus, each remote unit is both powered and accessed by the communications bus. A relatively high voltage such as 36 volts or more is typically required for energy reserve deployment in any event, and in the illustrated embodiment, a central module provides power to remote modules over the communications bus itself, and divides the bus voltage into multiple levels to increase the transmission bandwidth. In the illustrated embodiment, the bus voltage is divided into ten different levels, which is sufficient to encode three digital bits of information in addition to bus idle and break character bits. This triples the message throughput when compared to a traditional binary coding structure. The receiver thresholds are graphically depicted in FIG. 7 as a function of the bus voltage Vbus. The bus voltage is depicted fractionally since the absolute voltage values for a given data bit code vary ratiometrically with the bus voltage. For example, a data bit code of 011 has a nominal voltage of (4/9) Vbus, and may vary within the range of (7/18) Vbus to (9/18) Vbus. An idle state of the bus is signified by full bus voltage, and a break code (signaling a transition from normal to high speed communication) is signified by a zero bus voltage.

Under normal operating conditions, communications are transmitted at a normal rate of 30 Kbaud and the signals are waveshaped and encoded using the multi-level, return-to-zero, fixed-pulse-width format described above. During a sensed collision, however, waveshaping is suspended, and communications are transmitted at a high speed rate of 495 Kbaud. As noted in respect to FIG. 7, a high speed message has a break character (signified by zero bus voltage) which is recognized by the receivers connected to the bus so that the high speed message can be given priority over any low speed messages being transmitted at the time.

A carrier sense multiple access/collision resolution (CSMA/CR) arbitration procedure is used to eliminate any information latencies. The CSMA/CR arbitration procedure allows any and all nodes to attempt to transmit data when the bus is in an idle state. Simultaneous accessing of the bus by multiple nodes is detected by all nodes and results in a bit by bit arbitration of the message in order to determine the highest priority bus message. The transmission of the highest priority message continues while the other nodes discontinue transmission and attempt to retransmit their information at the next bus idle state. This procedure allows the sensors connected to the bus to operate in an asynchronous fashion.

Figure 8:
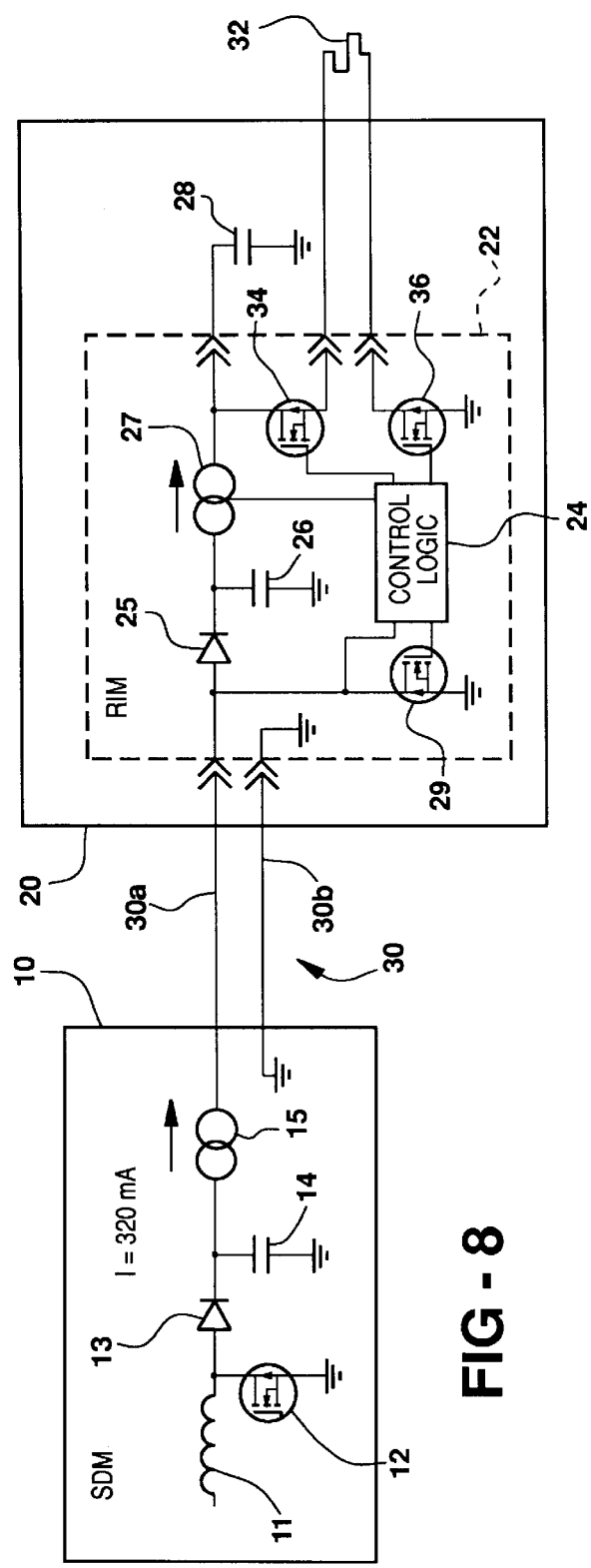
FIG. 8 is a system block diagram of a distributed SIR system according to this invention, including a Sensing and Diagnostic Module (SDM) and a Remote Initiator Module (RIM).

A high level block diagram of a distributed SIR system according to this invention is depicted in FIG. 8. The depicted system elements include a remote sensing and diagnostic module (SDM) 10, a remote initiator driver 20, a two-wire communication bus 30 interconnecting all of the modules of the system, and a restraint initiator 32.

The SDM 10 includes an inductor 11, a MOSFET 12, an output diode 13, and a capacitor 14 configured as a boost power supply. The purpose of this circuitry is to up regulate the vehicle ignition voltage to a higher value that is subsequently used to power the remote devices connected to the communication bus 30. The nominal value of this power supply is 25V. The power supply is buffered from bus line 30a by current source 15 with a nominal current limit of 320 mA. The 320 mA value is selected based on the quiescent operating current requirements of the remote mounted devices as well as to ensure there is sufficient drive capability to slew the bus 30 with the desired slope. The SDM also provides a ground reference for the bus over the wire 30b.

The remote initiator module (RIM) 20 receives message from the bus 30, transmits messages over the bus 30, and interfaces the bus 30 with the restraint initiator 32. With the exception of an energy reserve capacitor 28, the circuit elements for performing these functions may be formed on a single integrated circuit 22, as indicated. Energy reserve capacitor 28 is coupled to the bus line 30a via isolation diode 25 and a current source 27 controlled by the control logic circuit 24. An additional capacitor 26 is coupled between the cathode of diode 25 and ground. In normal operation, the current source 27 is enabled, and the capacitors 26 and 28 are charged up to the nominal bus voltage (25V). During restraint deployment, the current source 27 is disabled to isolate bus line 30 a from the energy reserve capacitor 28, which provides the current for firing initiator 32. The deployment current is controlled by control logic circuit 24, which controls the conduction of FETs 34 and 36 connected to the terminals of initiator 32. In addition to receiving and transmitting messages (described below) the Control Logic circuit 24 also includes a state machine to carry out the above-described deployment control method, and stores Node, Deployment Event and Occupant Zone ID codes for the associated restraint device.

Figure 9:
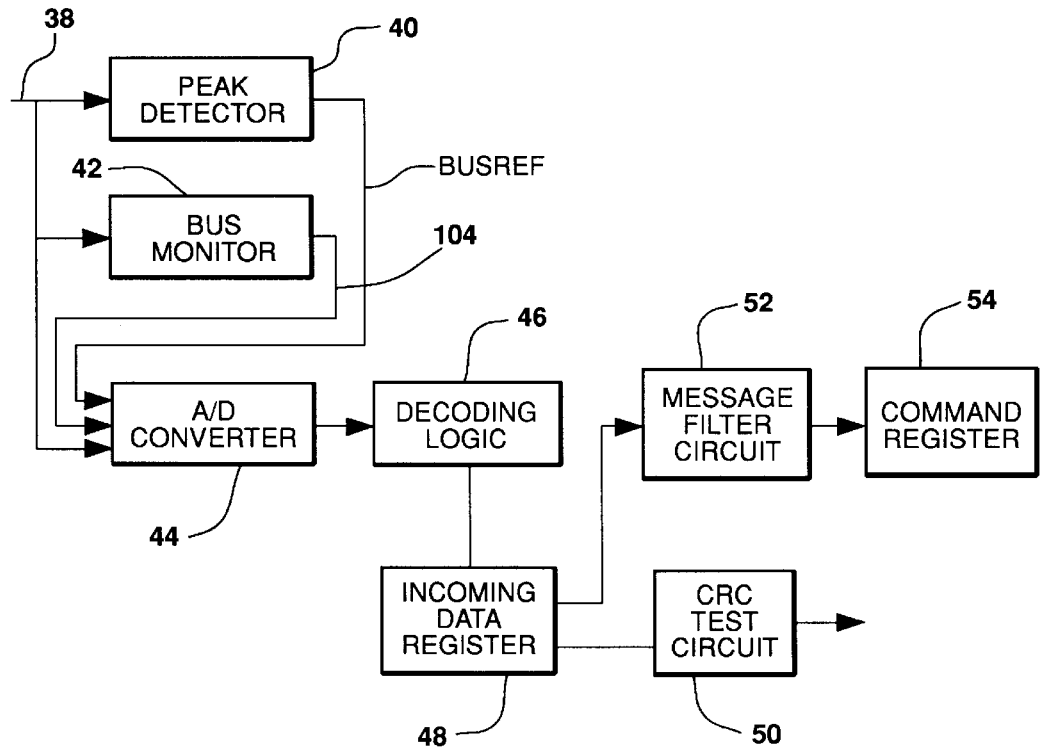
FIG. 9 is a block diagram of a receiver circuit for the RIM of FIG. 8.

The receiver function of the Control Logic circuit 24 is depicted in further detail in the block diagrams of FIGS. 9 and 10. As seen in FIGS. 8–9, the bus voltage is applied via line 38 as an input to Peak Detector 40, Bus Monitor 42 and A/D Converter 44. The Peak Detector 40 develops a signal, referred to herein as Busref, indicative of the idle voltage of the bus 30, and provides such signal as an input to A/D converter 44. The Bus Monitor 42, described in further detail below in reference to FIG. 10, distinguishes between the data transmission and idle states of bus 30, and signals A/D Converter 44 via line 104 when to sample the bus voltage. The A/D Converter 44, which may be a conventional three-bit device, generates the three-bit digital code equivalent of each sampled bus voltage. The Decoding Logic 46 reconstructs the message by stuffing eight successive digital codes generated by A/D Converter 44 into a 24-bit register, and off-loads the message into the Incoming Data Register 48. The CRC portion of the message is provided to a CRC Test Circuit 50 which checks for message integrity as described above, and the remainder of the message is provided to Message Filter Circuit 52 which determines if the message is intended for reception by this particular RIM. Thus, the Message Filter Circuit 52 operates as described above to check the Address Mode Selection bit and the Request/Response Identifier bit to identify the contents of the Address data. If the Message Filter Circuit 52 determines that the message is intended for RIM 20, the Command portion of the message is provided to Command Register 54, which is accessed by other circuits within Control Logic circuit 24.

As indicated above, the Bus Monitor circuit 42 controls the strobe line that triggers the A/D converter 44 after an appropriate time delay that allows for bus voltage stabilization. Referring to FIG. 10, bus line 30a is provided as an input via line 38 to the comparators 60 and 62. The comparator 60 compares the bus voltage to (15/16)Busref to detect an incoming message pulse, and generates a signal (Start of Pulse) on line 64 signifying the start of a message. The circuit produces a Bus Idle signal on line 86 and a A/D Sample signal on line 104.

The Start of Pulse signal is modulated with a 8 MHz clock signal by AND-gate 66 and applied to the clock input of Ripple Counter 68. An AND-gate 70 coupled to the Q4 and Q5 outputs of Ripple Counter 68 generates a signal which is delayed from the leading edge of the Start of Pulse signal by approximately 3 $\mu$sec, a time sufficient to allow the wave-shaped bus voltage to stabilize at the intended value. The output of AND-gate 70 is applied directly to the Set input and through OR-gate 72 to the Reset input of latch 74 to produce a corresponding Low Speed Sample signal on line 76. The inverter 78 clears Ripple Counter 68 when the Start of Pulse signal on line 64 terminates.

The Start of Pulse signal is also used to determine when the bus voltage has returned to its idle state. To this end, the inverted Start of Pulse signal from inverter 78 is modulated by the 8 MHz clock signal by AND-gate 80 and applied to the clock input of Ripple Counter 82. The Q8 output of Ripple Counter 82 provides a 16 $\mu$sec delay from the termination of the Start of Pulse signal, signifying that the wave-shaped bus voltage has once again stabilized at its idle value. The bus voltage normally returns to its idle state between bits, and the 16 $\mu$sec delay distinguishes between an intermittent return to idle and the end of a message. The Q8 output is applied to the Set input of latch 84, which generates the Bus Idle output on line 86. The next Start of Pulse signal clears Ripple Counter 82 and latch 84.

The comparator 62 compares the bus voltage with a reference of (1/16) Busref to detect the presence of a Break pulse, signifying an incoming high speed communication. When the bus voltage falls below the reference, comparator 62 produces a signal on line 90 which is modulated with the 8 MHz clock signal by AND-gate 92 and applied to the clock input of Ripple Counter 94. The Q8 output of Ripple Counter 94 provides a 16 $\mu$sec delay relative to the signal on line 90, signifying that the bus voltage has stabilized at the Break voltage level. The Q8 output is applied directly to the Set input and through OR-gate 100 to the Reset input of latch 96, which generates the BRK/High Speed Sample signal on line 98. The Bus Idle signal resets the latch 98 via OR-gate 100 when the bus returns to its idle state. The Low Speed Sample signal on line 76 and the BRK/High Speed Sample signal on line 98 are combined in OR-gate 102 to form the A/D Sample signal on line 104.

Figure 7:
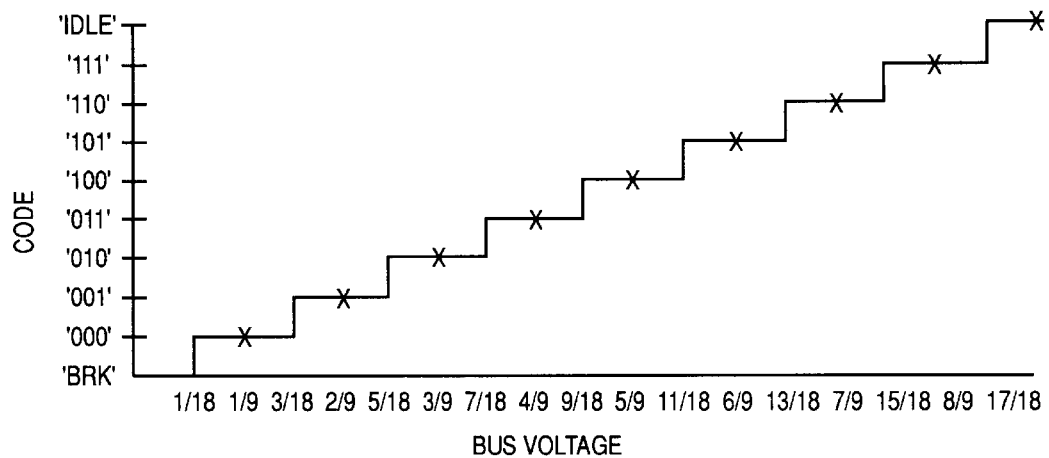
FIG. 7 is a diagram graphically illustrating a multi-level transmission protocol.
Figure 11:
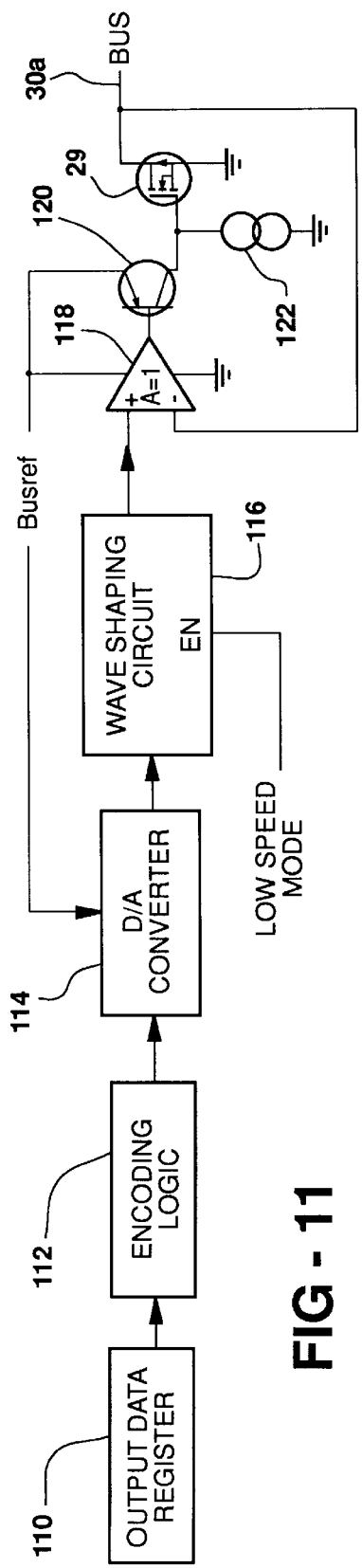
FIG. 11 is a block diagram of a transmitter circuit for the RIM of FIG. 8.

The transmitter function of the Control Logic circuit 24 is depicted in further detail in the block diagram of FIG. 11. Messages to be transmitted, such as diagnostic messages, are loaded into the Output Data Register 110. The Encoding Logic 112 parses the message into a series of thirteen 3-bit bytes and provides them in succession as inputs to a conventional 3-bit D/A Converter 114. The idle bus voltage, Busref, is provided as a reference voltage input to D/A converter so that its analog voltage output ratiometrically conforms to the bus voltage, as indicated in the graph of FIG. 7. A Wave Shaping Circuit 116 enabled during Low Speed Mode smoothes the output of D/A converter 114 in order to minimize the radiated emissions generated by the message transmission, and drives the unity gain buffer amplifier 118. The buffer amplifier 118, in turn, drives the base of transistor 120, which is referenced to idle bus voltage, Busref. Transistor 120 drives the gate of FET 29, and current source 122 discharges the gate when the drive signal from transistor 120 is reduced or removed. The drain-to-source circuit of FET 29 is connected between the bus line 30a and ground as shown in FIG. 8. The bus line 30a will be driven to the lowest reference voltage generated by any FET 29, thereby giving priority to the smallest binary code (i.e. '000'). All other output driver stages will be driven below their desired output voltage and will turn off.

While this invention has been described in reference to the illustrated embodiment, it is expected that various modifications in addition to those suggested above will occur to those skilled in the art. In this regard, it will be understood that the scope of this invention is not limited to the illustrated embodiment, and that systems incorporating such modifications may fall within the scope of this invention, which is defined by the appended claims.

I claim:

The embodiments of the invention in which an exclusive property or privilege in claimed are defined as follows:

1. In a vehicular supplemental restraint system including a plurality of sensor modules and deployment modules in distributed locations of the vehicle and inter-connected for communication over a common data bus, each of said deployment modules for deploying a respective supplemental restraint device, a communication method comprising the steps of:

assigning three types of identification codes to each of said deployment modules, including:
(a) a Node identification code specific to that deployment module;
(b) one or more Deployment Event identification codes corresponding to predefined classifications of crash events for which the respective supplemental restraint device is to be deployed; and
(c) an Occupant Zone identification code identifying a vehicle passenger seating position associated with the respective supplemental restraint device;

communicating with said deployment modules by transmitting a message over said data bus including a command field containing a command and an address field containing one of said Node identification codes, Deployment Event identification codes and Occupant Zone identification codes; and in a given deployment module, receiving the transmitted message, and responding to the command in said command field if the identification code in said address field corresponds to one of said Node identification codes, Deployment Event identification codes and Occupant Zone identification codes assigned to such given deployment module.

2. The communication method of claim 1, wherein said transmitted message includes an address identifier field that designates the type of identification code in said address field.

3. In a vehicular supplemental restraint system including a plurality of occupant position sensor modules associated with respective passenger seating positions, and a plurality of deployment modules in distributed locations of the vehicle for deploying respective supplemental restraint devices, said occupant position sensor modules and said deployment modules being inter-connected for communication over a common data bus, a communication method comprising the steps of:

assigning an Occupant Zone identification code to each of said deployment modules identifying a vehicle passenger seating position associated with the respective supplemental restraint device;

transmitting a message to said deployment modules from a given one or more of said occupant position sensor modules over said common data bus, said message including information indicative of the presence of a vehicle occupant in a respective passenger seating position, and an Occupant Zone identification code corresponding to that passenger seating position; and in each of said deployment modules, receiving said transmitted message and responding to the information included in said message if the Occupant Zone identification code included in said message corresponds to the Occupant Zone identification code assigned to that deployment module.

4. In a vehicular supplemental restraint system including a plurality of vehicle crash sensor modules associated with respective zones of the vehicle, and a plurality of deployment modules in distributed locations of the vehicle for deploying respective supplemental restraint devices, said crash sensor modules and said deployment modules being inter-connected for communication over a common data bus, a communication method comprising the steps of:

assigning one or more Deployment Event identification codes to each of said deployment modules identifying one or more types of crash events for which the respective supplemental restraint device is to be deployed;

in response to sensing of a crash event by one or more of said crash sensor modules, transmitting a message to said deployment modules over said common data bus, said message including a command related to such sensed crash event, and a Deployment Event identification code corresponding to the type of such sensed crash event; and in each of said deployment modules, receiving said transmitted message and responding to the command included in said message if the Deployment Event identification code included in said message corresponds to the Deployment Event identification code assigned to that deployment module.

* * * * *